UNITED STATES PATENT OFFICE.

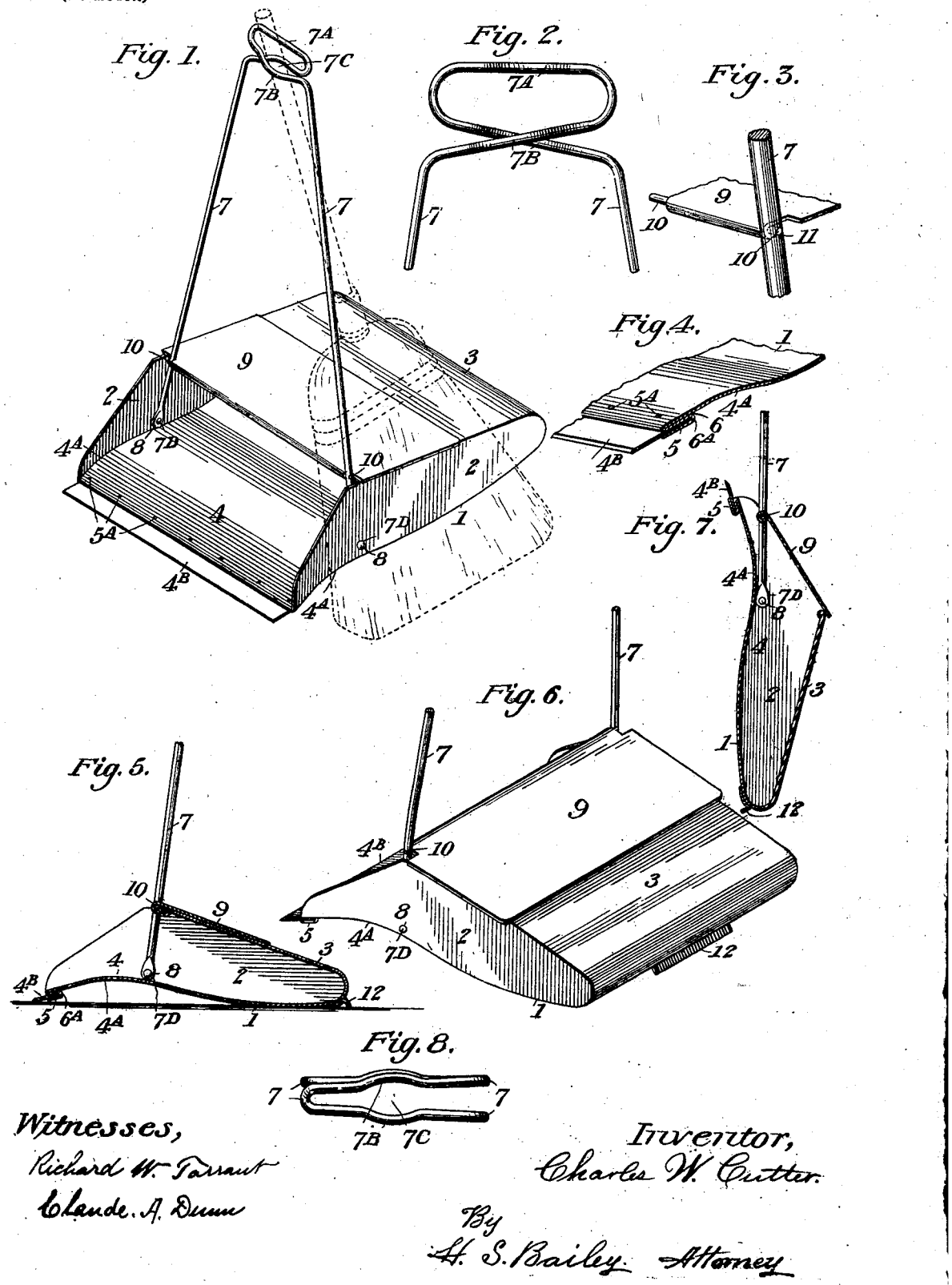

CHARLES WILLIAM CUTTER, OF DENVER, COLORADO.

DUST-PAN.

SPECIFICATION forming part of Letters Patent No. 677,950, dated July 9, 1901.

Application filed July 28, 1900. Serial No. 25,169. (No model.)

*To all whom it may concern:*

Be it known that I, CHARLES WILLIAM CUTTER, a citizen of the United States of America, residing at Denver, in the county of Arapahoe and State of Colorado, have invented certain new and useful Improvements in Dust-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in dust-pans; and the objects of my invention are, first, to provide a dust-pan having a handle portion long enough to enable a person to operate it while standing nearly erect, and having the handle pivotally attached to the pan in such a manner and position that when the pan is raised from the floor by the handle it will tip up with its open end against the handle, and having an open mouth portion at the front of the dust-pan and provided with a cover or lid attached to said handle portion in such a manner that when the pan is raised by the handle and tips up against it it moves under the lid or cover and closes the mouth of the dust-pan; second, to provide a dust-pan with a floor or carpet catching dog which catches into the carpet or floor and prevents the pan from slipping back away from the broom when sweeping dust into it, and, third, to provide a loop adapted to receive and hold a broom-handle, so that the dust-pan and broom may be hung up together. I attain these objects by the mechanism illustrated in the accompanying drawings, in which—

Figure 1 is a perspective view of my improved dust-pan, showing in dotted lines a broom supported by the handle of the pan. Fig. 2 is a fragment of the handle. Fig. 3 is a fragment of the dust-pan and shows the pivotal connection of the cover to one side of the handle. Fig. 4 is a fragment of the dust-pan and shows the way the flexible rubber lip is secured to the edge of the pan. Fig. 5 is a vertical section of the dust-pan in a lowered position. Fig. 6 is a perspective view of the body of the dust-pan, showing the carpet-catching dog, but showing only a fragment of the handle. Fig. 7 is a vertical section of the dust-pan in a depending position; and Fig. 8 is a plan view of the hand-grasping portion of the handle, showing the curved recess formed in the opposite parts of the wire forming the handle in which a broom-handle is held.

Similar numerals of reference refer to similar parts throughout the several views.

Referring to the drawings, the numeral 1 designates the bottom of the pan, 2 the sides of the pan, and 3 its top.

The pan is made slightly tapering narrower from its mouth or entrance end to its rear or opposite end in order that a number of pans can be telescoped together one within the other for shipment.

The top 3 of the pan is soldered or otherwise fastened to the bottom and sides of the pan. The top extends from the rear end of the pan two-thirds of its length toward its mouth and rests on and is secured to the sides, which extend a short distance above the bottom of the pan. A dust-chamber is formed between the top and bottom and sides. From the end of the top the sides and bottom extend forward, forming a mouth portion 4. This mouth portion is curved across its whole width upward from its edge into a slight roll $4^A$, from which it blends into the bottom. The object of this upward curved roll is to keep the dust as it is swept into the pan from rolling easily out.

At the edge of the dust-pan I secure a flexible piece of thin rubber $4^B$, which I preferably secure in a recess 5, formed by extending the lip of the bottom of the pan a short distance beyond the sides, and then folding or lapping it under the edge a short distance to form the top 6 of the rubber-holding recess, and then again folding or bending it to extend outward from the bend $6^A$ to near the edge of the mouth. The edge of the rubber is then inserted in the slot 5 and the folds and lip are pressed or hammered and closed together. A number of prick-punch dents $5^A$ are then made along the fold to drive points of the tin edge into the rubber, which holds it securely.

The curved edge of the mouth of the dust-pan holds the rubber at a slightly-downward angle, which causes its edge at the free end to bear against the floor when the pan is placed upon it. To the opposite sides of the pan I pivotally secure a handle 7, which I make of a single length of wire. This wire is bent at the center of the length into a square-shaped loop 7<sup>A</sup>. The ends are bent to pass one another at the lower portion of the loop and they are bent to stand at such a distance apart that they will have to be sprung slightly apart in order to allow a broom-handle to be passed between them, and at their central portion a short outward curve 7<sup>B</sup> is bent in each. These two curved ends are oppositely disposed and form together a circular recess 7<sup>C</sup> at the central portion of the lower portion of the loop. From the loop portion the ends diverge slightly outward and extend to the insides of the pan just in front of the top, where they are pivotally secured at 7<sup>D</sup> to the sides of the pan. The pivotal connection is formed by bending the extreme ends of the wire handle at about right angles to their lengths and extending them loosely through holes 8, formed in the side, and then upsetting the ends on the outside of the sides. The position of the pivotal connection of the handle with the pan is so much nearer the front edge of the mouth of the pan than to the rear end that the rear end overbalances the front end when the pan is raised by the handle, and the rear end tips down, while the mouth tips up against the wires of the handle. To the opposite side wires of the handle I pivotally secure a cover or lid 9, which is arranged to rest on top of the top of the dust-pan. This cover is large enough to close the mouth or entrance to the dust-chamber of the pan. The cover is pivotally connected to the side wires of the handle by trunnion-pins 10, which are secured to the opposite ends of one edge of the cover. The ends of the trunnion-pins extend freely through holes 11, formed in the side wires of the handle. When the pan is raised from the floor, the mouth of the pan swings up under the cover and it is closed. The pan can then be hung up with dust in it or be carried out doors without danger of currents of air blowing it out of the pan.

When using an ordinary dust-pan to collect sweepings, a person holds it by the handle with one hand and uses a broom with the other, and every time the broom is moved into the mouth of the pan in sweeping dust the pressure of the broom against the mouth of the pan is apt to and frequently does cause it to slip back away from the broom. In order to prevent this, I secure to the under side of the rear edge of the pan a depending blade or spur 12, of metal, preferably tin, which I call a "carpet" or "floor" catching dog. The edge of this blade is made sharp enough to catch into the carpet or floor and prevent the pan's slipping away from the broom. When using my dust-pan, the handle is leaned back against the cover, in which position it will stand erect. The operator can then use a broom with both hands, as the catching-dog will hold the pan from slipping.

In Fig. 1 I show a broom in dotted lines held by its handle portion in the circular recess formed in the handle of the dust-pan.

Having described my invention, what I claim as new, and desire to secure by Letters Patent, is—

A dust-pan composed of the following instrumentalities: a bottom portion having an entrance-lip and tapered narrower from said lip to its opposite end, a convex-curved portion adjacent to said lip, a depending lug at the edge of its rear end provided with a sharp edge, side portions projecting upward from the side edges of said tapering bottom portion and extending from the rear end of said bottom portion to its lip portion, and having said bottom portion and said sides provided with an open space adjacent to said entrance-lip and positioned at and adjacent to said convex-curved portion, a top cover portion secured to said side portions and the rear end of said pan, and extending from said rear end to within a short distance of the lip of said bottom portion, and arranged to form a dust-holding chamber, with its entrance adjacent said lip, a suitable handle provided with two opposite end portions, each of which is pivoted to the opposite side portions of said dust-pan, a loose cover or lid pivoted at one edge to points near the said end portions of said handle, and arranged to rest loosely on the top of said top portion of said dust-chamber, and arranged and adapted, when said handle is swung down against the said lip portion of said pan, to move down between said side portions and close the entrance to said dust-chamber, substantially as described.

In testimony whereof I affix my signature in presence of two witnesses.

CHARLES WILLIAM CUTTER.

Witnesses:
BESSIE THOMPSON,
WILLIAM H. SAUVAGE.